J. H. RYALLS.

REVERSING MECHANISM FOR THE BAND CYLINDERS OF SPINNING MULES.

APPLICATION FILED AUG. 29, 1910.

Reissued Feb. 24, 1914.

13,692.

2 SHEETS—SHEET 1.

Witnesses:

Jas. E. Hutchinson:

Agnes T. Hayes.

Inventor:

John H. Ryalls,

By Chas. J. Williamson

Attorney:

COLUMBIA PLANOGRAPH CO., WASHINGTON, D.C.

J. H. RYALLS.

REVERSING MECHANISM FOR THE BAND CYLINDERS OF SPINNING MULES.

APPLICATION FILED AUG. 29, 1910.

Reissued Feb. 24, 1914.

13,692.

2 SHEETS—SHEET 2.

Witnesses:

Jas. E. Hutchinson.

Agnes T. Hayes.

Inventor:

John H. Ryalls,

By Chas. J. Williamson

Attorney.

COLUMBIA PLANOGRAPH CO., WASHINGTON, D. C.

UNITED STATES PATENT OFFICE.

JOHN HENLEY RYALLS, OF CHARLOTTESVILLE, VIRGINIA, ASSIGNOR, BY MESNE ASSIGNMENTS, TO RYALLS MACHINE COMPANY, A CORPORATION OF VIRGINIA.

REVERSING MECHANISM FOR THE BAND-CYLINDERS OF SPINNING-MULES.

13,692. Specification of Reissued Letters Patent. Reissued Feb. 24, 1914.

Original No. 942,752, dated December 7, 1909, Serial No. 477,857. Application for reissue filed August 29, 1910. Serial No. 579,520½.

*To all whom it may concern:*

Be it known that I, JOHN H. RYALLS, a citizen of the United States, and a resident of Charlottesville, in the county of Albemarle and State of Virginia, have invented certain new and useful Improvements in Reversing Mechanism for the Band-Cylinders of Spinning-Mules, of which the following is a specification.

A spinning-mule ordinarily contains 420 spindles and sometimes as many as 600 spindles, each spindle being revolved by a band or belt running from the band cylinder to a whirl on the spindle. It is essential to reverse the direction of the revolution of the spindles. This reversal of direction of the spindles when performed by hand means the lifting of each spindle out of its step bearing, and the removal and reapplication to the spindle whirl of the band and it is to enable such removal and reapplication of the band of the spindle that the spindle is lifted out of its step bearing. The time required to do this work by hand in a spinning-mule of 420 spindles is so great as to be a serious loss, and besides this, the removal and replacing of the spindle in its step bearing injures the bearing, which is of brass, by the striking thereagainst of the spindle end, resulting in burs against which the spindle in its revolution rubs and results in such friction as to wear out the bearing. Again in changing the bands by hand they are slackened, the result being that bad thread is produced, which if suitable for use at all is available only for selvage, and this means often a serious loss.

The object of the present invention is to provide a means for changing the direction of travel of the bands within a minimum of time and without the objectionable results just mentioned.

Figure 1:
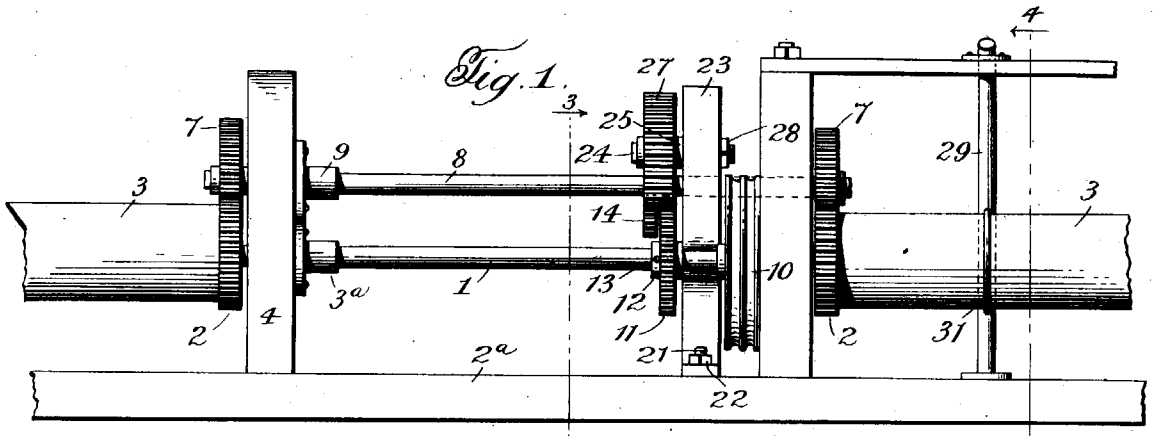
Figure 5:
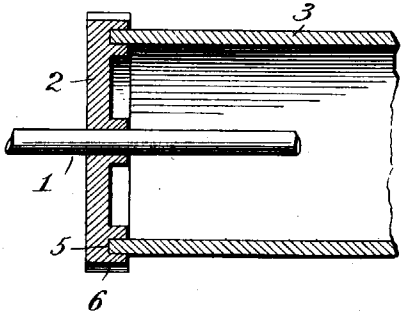
Figure 3:
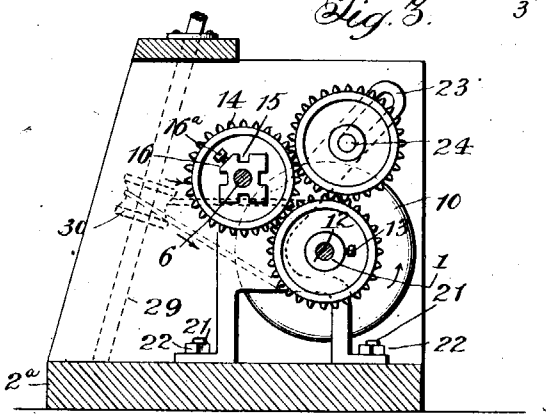
Figure 2:
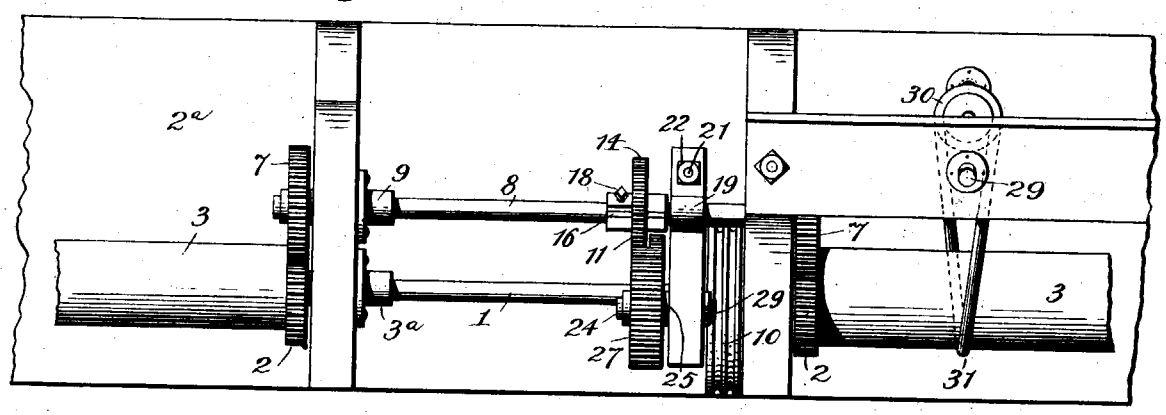
Figure 4:
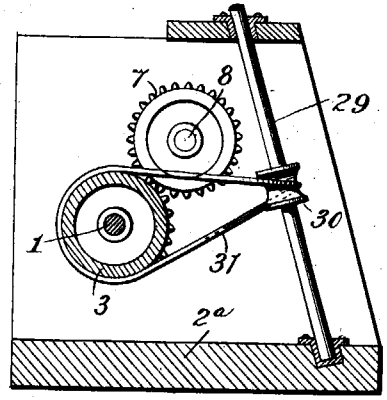

Referring to the drawings forming a part hereof—Figure 1 is a side view of the improvement; Fig. 2 is a plan view; Fig. 3 is a section on the line 3—3 of Fig. 1, looking in the direction of the arrow; Fig. 4 is a section on line 4—4, Fig. 1; and Fig. 5 is a longitudinal section of one of the cylinders.

In the present embodiment of the invention, the main shaft 1 has its ends loosely journaled in the heads 2 of the band cylinders 3, the shaft being mounted in bearings $3^a$ secured to the frames 4 supported on the base $2^a$. The heads 2 of the cylinders are provided with an annular recess 5, in which is received the edge of the cylinder as shown in Fig. 5, and the periphery of the head is provided with gear teeth 6, which mesh with a pinion 7, secured to a counter shaft 8, journaled in bearings 9 on the frame above and in front of the main shaft.

The main shaft 1 is provided with a pulley 10 for connecting it with a source of power, and with a pinion 11; having a hub 12 keyed on the shaft, and also provided with a set screw 13. On the counter shaft 8 is a gear wheel 14, which is provided with a square opening as shown in Fig. 3, the sides of the opening being provided with teeth 15, and the gear wheel is longitudinally movable on a block 16 provided with an opening for receiving the shaft, and with a set screw $16^a$ engaging the shaft for retaining the block in position, and the block is provided with longitudinal grooves 18, in which are movable the teeth 15, before mentioned.

It will be evident that the gear wheel may be moved longitudinally of the shaft, but is constrained to rotate therewith.

A bracket 19 is arranged between the power wheel 10, and the gear wheel 11, and is secured to the base 20 by means of bolts 21, passing through openings in lateral lugs 22, on the bracket, and engaging the base. The bracket 19 is provided with a bearing for receiving the shaft 8, and with a slotted extension 23 extending upwardly and forwardly from the bracket, at an angle of approximately 45 degrees.

A stud shaft 24 is movable in the slot, the shaft being provided with a collar 25 at approximately its center. On one side of the collar, the shaft is formed into a journal pin on which is journaled a broad pinion 27. On the other side of the collar, the shaft is threaded and passes through the slot, the free end being engaged by a nut 28.

It will be evident from the description that by loosening the nut 28, the stud shaft may move toward and from the counter shaft and the main shaft, whereby to bring the gear into mesh with the pinions 11 and 14.

The spindles 29 are each provided with a whirl 30, and a belt 31 passes from the band cylinder to each spindle, the belt being twisted between the cylinder and the whirl.

The gears 7 and 12 are each keyed to their respective shafts, whereby to constrain them to rotate therewith, and are prevented from longitudinal movement by the set screws before mentioned.

In operation with the parts shown as arranged in Fig. 1, rotation of the power shaft will cause the band cylinders to rotate in the opposite direction, that is if the power shaft is rotated in the direction of the arrow shown in Fig. 3, the belts or bands 31 will move in the direction of the arrow shown on the upper run in the said figure.

When it is desired to reverse the direction of the band cylinders, the nut 28 is loosened and the broad pinion is moved out of mesh with the gear wheels 14 and 11. The gear wheel 14 is then shifted longitudinally of the shaft, until it engages the gear wheel 11, directly. A rotation of the power shaft in the direction of the arrow shown in Fig. 3 will now rotate the cylinders in the same direction, and the bands will move in the direction of the arrow shown on the lower run in Fig. 3.

What I claim is—

1. In an apparatus of the class described, the combination with alined band cylinders spaced apart, of a power shaft between the cylinders, a gear on said power shaft, a counter-shaft directly meshing gears on countershaft and cylinders, respectively, a bracket having a bearing for said counter-shaft said bracket being provided with an extension extending outwardly relatively to the bearing for the counter-shaft and slotted longitudinally, a broad pinion, a stud shaft having a bearing for said broad pinion means securing the stud shaft adjustably in the slot of the bracket extension whereby the stud shaft may be adjusted in or out relatively to the gear on the power shaft, and a pinion keyed on and adjustable along the counter-shaft into or out of mesh with the gear on the power shaft, said pinion meshing with the broad pinion when the latter is moved into position to mesh with the gear on the power shaft, all substantially as and for the purposes set forth, whereby the broad pinion may be utilized to transmit motion from the gear on the power shaft to the counter-shaft or the parts may be adjusted so that the gears on the power shaft and counter-shaft will be meshed directly together as set forth.

2. In an apparatus of the class described the combination with alined band cylinders spaced apart, of a power shaft between the cylinders, a gear on the power shaft, a counter-shaft, directly meshing gears on countershaft and cylinders, respectively, a gear on the counter-shaft adjustable into and out of mesh with the gear of the power shaft, a pinion adjustable into and out of mesh with the gear on the power shaft and adapted when meshed with the gear on the power shaft to also mesh with the gear on the counter-shaft, whereby the pinion may be adjusted to transmit motion from the gear on the power shaft to that on the counter-shaft or the gear on the counter-shaft may be adjusted to mesh directly with that of the power shaft substantially as and for the purpose set forth.

3. In an apparatus of the class described the combination with alined band cylinders spaced apart of a power shaft between the cylinders, a gear on the power shaft, a counter-shaft, directly meshing gears on countershaft and cylinders, respectively, a gear keyed on and movable along the counter-shaft into and out of mesh with the gear of the power shaft, a pinion broader than the gear on the power shaft and movable into and out of mesh with the gear on the power shaft and adapted when meshed with the gear on the power shaft to also mesh in a different plane with the gear on the counter-shaft all substantially as described, whereby the broad pinion may be adjusted to transmit motion from the gear on the power shaft to that on the counter-shaft or the gear on the counter-shaft may be adjusted to mesh directly with that of the power shaft and the broad pinion be moved out of mesh with both of said gears substantially as and for the purpose set forth.

4. The combination of alining band cylinders and gearing for revolving said cylinders in opposite directions at different times comprising a pair of shafts, one of which is a power shaft situated between the cylinders and the other a counter-shaft, gearing for directly or indirectly revolving the counter-shaft from the power shaft, and gear connections between the counter-shaft and the cylinders consisting of directly intermeshing gears on countershaft and cylinder, respectively.

In testimony that I claim the foregoing I have hereunto set my hand.

JOHN HENLEY RYALLS.

Witnesses:
G. F. Compton,
W. L. Maupin.

Copies of this patent may be obtained for five cents each, by addressing the "Commissioner of Patents, Washington, D. C."